United States Patent Office 3,250,763
Patented May 10, 1966

3,250,763
WATER-INSOLUBLE MONOAZO-DYESTUFFS
Helmut Gies, Hofheim, Taunus, and Helmut Lindner and Arthur Siebert, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 18, 1963, Ser. No. 288,626
Claims priority, application Germany, June 23, 1962, F 37,144; Nov. 29, 1962, F 38,422
6 Claims. (Cl. 260—207)

The present invention relates to water-insoluble monoazo-dyestuffs and to a process for preparing them; more particularly it relates to water-insoluble monoazo-dyestuffs having the general formula

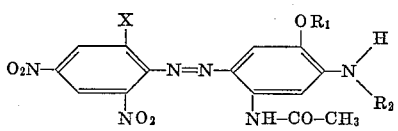

in which X represents a hydrogen, chlorine or bromine atom, $R_1$ represents an alkyl group which may be substituted by hydroxyl, alkoxy or acyloxy groups, and $R_2$ represents an alkyl, a cyanalkyl, an aralkyl, a $\beta$-hydroxy-$\delta$-chloropropyl or a $\beta$-acylethyl radical having the general formula

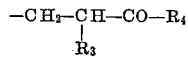

in which $R_3$ represents a hydrogen atom or an alkyl radical and $R_4$ represents an alkyl radical.

It has been found that valuable water-insoluble monoazo-dyestuffs having the general formula

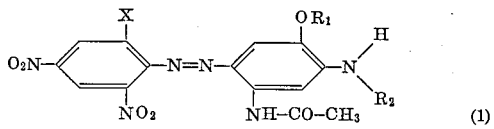

in which X represents a hydrogen, chlorine or bromine atom, $R_1$ represents an alkyl group which may be substituted by hydroxyl, alkoxy or acyloxy groups, and $R_2$ represents an alkyl, a cyanalkyl, an aralkyl, a $\beta$-hydroxy-$\delta$-chloropropyl or a $\beta$-acylethyl radical having the general formula

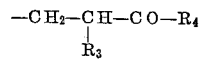

in which $R_3$ represents a hydrogen atom or an alkyl radical and $R_4$ represents an alkyl radical, are obtained by diazotizing amines having the general formula

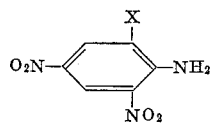

in which X is defined as above, and coupling them in an acid medium with coupling components having the general formula

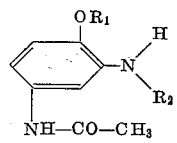

in which $R_1$ and $R_2$ are defined as above.

As diazo components there may be used 2,4-dinitraniline and derivatives thereof substituted in 6-position by a chlorine or a bromine atom. Suitable coupling components are for example 2 - n - butylamino - 4 - acetamino - 1 - $\beta$ - aceto - hydroxyphenetole,
2 - ethylamino - 4 - acetamino - 1 - $\beta$ - aceto - hydroxyphenetole,
2 - n - butylamino - 4 - acetamino - 1 - $\beta$ - methoxy - phenetole,
2 - iso - hexylamino - 4 - acetamino - 1 - $\beta$ - methoxyphenetole,
2-$\delta$-phenylpropylamino-4-acetamino-1-phenetole,
2-n-butylamino-4-acetamino-1-phenetole,
2-iso-pentylamino-4-acetamino-1-phenetole,
2-iso-hexylamino-4-acetamino-1-phenetole,
2 - (3' - hydroxy - benzylamino) - 4 - acetamino - 1-phenetole,
2-(2'-furfurylamino)-4-acetamino-1-phenetole,
2-n-propylamino-4-acetamino-1-phenetole,
2-$\beta$-cyanethylamino-4-acetamino-1-phenetole or
2 - $\beta$ - cyanethylamino - 4 - acetamino - 1 - $\beta$ - hydroxyphenetole.

The novel monoazo-dyestuffs obtainable in the process of the present invention dye as dispersion dyestuffs semi- and fully synthetic fibers, such as acetate silk and polyethylene terephthalate fibers, violet to blue shades and in admixture with other dyestuffs are suitable for producing black shades. The dyeings obtained are distinguished by a very good fastness to light and, as a rule, also by a good fastness to thermofixation.

The following examples serve to illustrate the invention, but they are not intended to limit it thereto, the parts being by weight unless otherwise stated and the relationship of parts by weight to parts by volume being the same as that of the kilogram to the liter.

*Example 1*

21.7 parts (1/10 mol) of 2,4-dinitro-6-chloraniline are diazotized in usual manner in sulfuric acid with nitrosylsulfuric acid. This diazo solution is run, while stirring, into a solution of 31 parts (1/10 mol) of 2-n-butylamino-4-acetamino-1-$\beta$-acetohydroxy-phenetole (obtainable by reductive alkylation from 2-nitro-4-acetamino-1-$\beta$-aceto-hydroxy-phenetole and n-butanal) in 300 parts of glacial acetic acid to which 1 part of amido-sulfonic acid and 500 parts of ice had been added. The mixture is then diluted with water to about 3000 parts by volume and the pH-value is adjusted to 3 by adding sodium acetate solution.

After about 2 hours the precipitated dyestuff having the formula

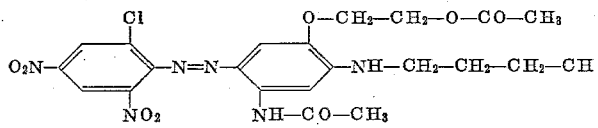

is filtered off, washed with water until neutral and dried. 50 parts of a dyestuff are obtained which in an aqueous dispersion dyes polyethylene terephthalate fibers dark blue shades. The dyeings possess a very good fastness to light and to sublimation.

*Example 2*

26.2 parts (1/10 mol) of 2,4-dinitro-6-bromaniline are diazotized in usual manner in sulfuric acid with nitrosylsulfuric acid. The diazo solution obtained is run, while vigorously stirring, into a solution of 28 parts (1/10 mol) of 2-n-butylamino-4-acetamino-1-β-methoxy-phenetole (obtainable by reductive alkylation from 2-nitro-4-acetamino-1-β-methoxy-phenetole and n-butanal) in 300 parts of glacial acetic acid with the addition of ice. Subsequently the mixture is diluted with water to 3000 parts by volume, and the pH-value is adjusted to 3 by adding sodium acetate solution. After 2 hours the precipitated dyestuff is filtered off, washed with water until neutral and dried. It has the following composition:

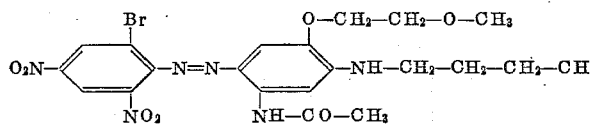

It dyes polyethylene terephthalate fibers dark blue shades. The dyeings possess a very good fastness to light and to sublimation.

*Example 3*

18.3 parts (1/10 mol) of 2,4-dinitraniline are diazotized in usual manner with nitrosylsulfuric acid. The diazo solution is run, while stirring, into a soution of 30.8 parts (1/10 mol) of 2-iso-hexylamino-4-acetamino-1-β-methoxy-phenetole (obtainable by reductive alkylation from 2-nitro-4-acetamino-1-β-methoxy-phenetole and 2-methylpentanal) in 300 parts of glacial acetic acid. Ice is added for cooling. The mixture is then diluted with water to 3000 parts by volume and the pH-value is adjusted to 3 by adding sodium acetate solution. The coupling product is worked up as described in Example 2. The dyestuff obtained having the formula

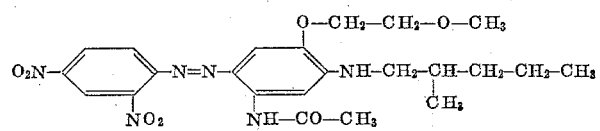

dyes polyethylene terephthalate fabric violet shades. The dyeings possess a very good fastness to light and to sublimation.

*Example 4*

22.4 parts (1/10 mol) of 2-nitro-4-acetamino-1-phenetole are dissolved in 150 parts of alcohol and alkylated by reduction with the addition of cinnamic aldehyde in the presence of a Raney nickel catalyst and hydrogen. After the removal of the catalyst the solvent and the cinnamic aldehyde in excess are distilled off. The residue is dissolved in 200 parts of glacial acetic acid and about 1 part of amidosulfonic acid is added. Into this solution is run, while vigorously stirring, a solution of 21.7 parts (1/10 mol) of diazotized 2,4-dinitro-6-chloraniline in 100 parts of concentrated sulfuric acid, while simultaneously adding about 800 parts of ice. The mixture is then diluted with water to about 3000 parts by volume and worked up as described in Example 1. The dyestuff obtained having the formula

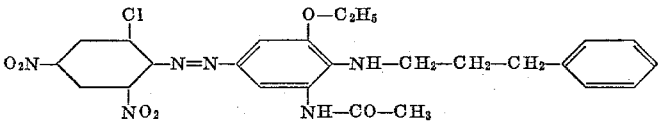

dyes polyethylene terephthalate fibers pure blue shades. The dyeings possess a very good fastness to light and a good fastness to sublimation.

*Example 5*

18.3 parts (1/10 mol) of 2,4-dinitraniline are diazotized in usual manner. This diazo solution is run into a solution of 25 parts (1/10 mol) 2-n-butylamino-4-acetamino-1-phenetole in 200 parts of glacial acetic acid to which ice had been added. After the introduction the mixture is worked up as described in Example 1. The dyestuff obtained having the formula

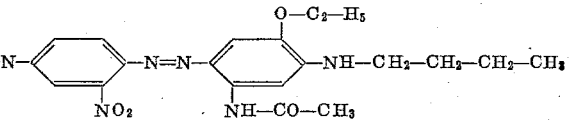

dyes polyester fibers violet shades. The dyeings possess a very good fastness to light.

*Example 6*

26.2 parts (1/10 mol) of 2,4-dinitro-6-bromaniline are diazotized in usual manner and the diazo solution obtained is run, while stirring and adding ice, into a solution of 30 parts (1/10 mol) of 2-(3'-hydroxy-benzylamino)-4-acetamino-1-phenetole (obtainable by reductive alkylation from 2-nitro-4-acetamino-1-phenetole and 3-hydroxy-benzaldehyde) in 300 parts of glacial acetic acid. The mixture is then diluted with water to about 3000 parts by volume, the pH-value is adjusted to 3 by adding sodium acetate solution and the mixture is worked up as described in Example 1. The dyestuff obtained having the formula

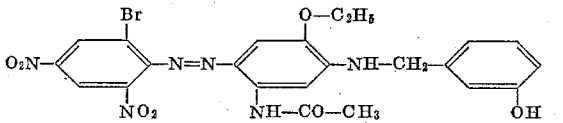

dyes polyethylene terephthalate fibers pure blue shades. The dyeings possess a very good fastness to light and a good fastness to sublimation.

The following table contains a certain number of further water-insoluble monazo-dyestuffs obtainable in the process of the present invention and having the general formula

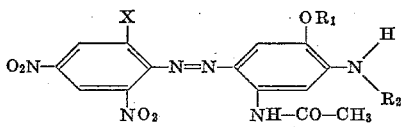

In the last column of the table the tints of the dyeings are indicated which can be obtained with these dyestuffs on polyester fabric.

| X | R₁ | R₂ | Tint |
|---|---|---|---|
| Br | —CH₂—CH₂—O—CO—CH₃ | —CH₂—CH₂—CH₂—CH₃ | Blue. |
| H | —CN₂—CH₂—O—CO—CH₃ | —CH₂—CH₂—CH₂—CH₃ | Violet. |
| Cl | —CH₂—CH₂—O—CO—CH₃ | —CH₂—CH₃ | Blue. |
| H | —CH₂—CH₂—OCH₃ | —CH₂—CH₂—CH₂—CH₃ | Violet. |
| Cl | —CH₂—CH₂—OCH₃ | —CH₂—CH₂—CH₂—CH₃ | Dark blue |
| Cl | —CH₂—CH₂—OCH₃ | —CH₂—CH—CH₂—CH₂—CH₃<br>        CH₃ | Blue. |
| Br | —CH₂—CH₂—OCH₃ | —CH₂—CH—CH₂—CH₂—CH₃<br>        CH₃ | Blue. |
| Br | —CH₂—CH₃ | —CH₂—CH₂—CH₂—⌬ | Blue. |
| H | —CH₂—CH₃ | —CH₂—CH₂—CH₂—⌬ | Violet. |
| Cl | —CH₂—CH₃ | —CH₂—CH₂—CH₂—CH₃ | Blue. |
| Br | —CH₂—CH₃ | —CH₂—CH₂—CH₂—CH₃ | Do. |
| H | —CH₂—CH₃ | —CH₂—CH₂—CH—CH₃<br>        CH₃ | Violet. |
| H | —CH₂—CH₃ | —CH₂—CH—CH₂—CH₂—CH₃<br>        CH₃ | Do. |
| Cl | —CH₂—CH₃ | —CH₂—CH—CH₂—CH₂—CH₃<br>        CH₃ | Blue. |
| Br | —CH₂—CH₃ | —CH₂—CH—CH₂—CH₂—CH₃<br>        CH₃ | Do. |
| H | —CH₂—CH₃ | —CH₂—⌬—OH | Violet. |
| Cl | —CH₂—CH₃ | —CH₂—⌬—OH | Blue. |
| Cl | —CH₂—CH₃ | —CH₂—C(furyl) | Do. |
| H | —CH₂—CH₃ | —CH₂—C(furyl) | Violet. |
| H | —CH₂—CH₃ | —CH₂—CH₂—CH₃ | Do. |
| Cl | —CH₂—CH₃ | —CH₂—CH₂—CN | Blue. |
| Br | —CH₂—CH₂—OH | —CH₂—CH₂—CN | Do. |

Example 7

21.7 parts (1/10 mol) of 2,4-dinitro-6-chloraniline are diazotized in usual manner in sulfuric acid with nitrosylsulfuric acid. The diazo solution thus obtained is run, while stirring, into a solution of 28.7 parts (1/10 mol) of 2-δ-chloro-β-hydroxy-propylamino-4-acetamino-phenetole in 300 parts of glacial acetic acid to which 1 part of amidosulfonic acid and 500 parts of ice had been added. The mixture is then diluted with water to about 3000 parts by volume and the pH-value is adjusted to 3 by adding sodium acetate solution. After about 2 hours the precipitated dyestuff having the formula

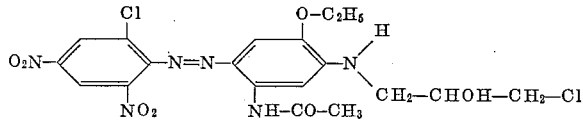

is filtered off, washed with water until neutral and dried. The dyestuff obtained dyes in an aqueous dispersion, at 120° to 130° C., polyethylene terephthalate fibers navy blue shades. The dyeings possess a very good fastness to light and to sublimation.

When using instead of the above-mentioned coupling component 2 - δ-chloro-β-hydroxy-propylamino-4-acetamino-1-β-methoxy-phenetole, a dyestuff possessing similarly good properties is obtained.

Example 8

18.3 parts (1/10 mol) of 2,4-dinitranilene are diazotized in usual manner with nitrosylsulfuric acid. The diazo solution obtained is run, while stirring, into a solution of 28.7 parts (1/10 mol) of 2-δ-chloro-β-hydroxy-propylamino-4-acetamino-phenetole in 300 parts of glacial acetic acid. Ice is added for cooling. The mixture is then diluted with water to 3000 parts by volume and the pH-value is adjusted to 3 by adding sodium acetate solution. After 2 hours the dyestuff is filtered off and washed with water until neutral. After drying the dyestuff is a violet-black powder which in an aqueous dispersion, at 130° C., dyes polyethylene terephthalate fibers violet shades. The dyeings obtained possess very good fastness properties.

When using instead of the above-mentioned coupling component 2-δ-chloro-β-hydroxy-propylamino-4-acetamino-anisole, a dyestuff possessing similarly good properties is obtained.

Example 9

26.2 parts (1/10 mol) of 2,4-dinitro-6-bromaniline are diazotized in usual manner with nitrosylsulfuric acid. The diazo solution obtained is run, while stirring, into a solution of 28.7 parts (1/10 mol) of 2-δ-chloro-β-hydroxy-proplyamino - 4 - acetamino - phenetole which had been cooled with ice. The mixture is then diluted slowly with water to 3000 parts by volume and the pH-value is adjusted to 3 by adding sodium acetate solution. The dyestuff is filtered off after 2 hours, washed until neutral and dried. It is a violet-black powder which dyes polyethylene terephthalate fibers in an aqueous dispersion, at 130° C., dark blue shades. The dyeings prossess a very good fastness to light and to sublimation.

When using instead of the above-mentioned coupling components 2-δ-chloro-β-hydroxy-propylamino-4-acetamino-1-β-hydroxy-phenetole or 2-δ-chloro-β-hydroxy-propyl-amino-4-acetamino-1-β-aceto-hydroxy - phenetole, a blue dyestuff possessing similarly good properties is obtained.

Example 10

21.7 parts of 2,4-dinitro-6-chloraniline are diazotized in usual manner in glacial acetic acid with nitrosysulfuric acid. The diazo solution thus obtained is run, while stirring, into a solution of 26.4 parts of 2-(β-acetyl-ethylamino)-4-acetamino-phenetole in 100 ml. of 1N-hydrochloric acid to which 1 part of amidosulfonic acid and 500 parts of ice had been added. The mixture is then diluted with water to about 300 parts by volume and after-stirred for about 2 hours. Subsequently the precipitated dyestuff having the formula $$O_2N-\underset{NO_2}{\underset{|}{C_6H_3(Cl)}}-N=N-\underset{NH-CO-CH_3}{\underset{|}{C_6H_3(O-C_2H_5)}}-NH-CH_2-CH_2-CO-CH_3$$

is filtered off, washed thoroughly with water, and dried in usual manner. The dyestuff obtained dyes in an aqueous dispersion, at 120° to 130° C., polyethylene terephthalate fibers navy blue shades. The dyeings possess a very good fastness to light and to sublimation.

When using instead of the above-mentioned coupling component 2-(β-acetylpropylamino)-4-acetamino - phenetole, a dyestuff possessing similarly good properties is obtained.

Example 11

18.3 parts of 2,4-dinitraniline are diazotized in usual manner with nitrosylsulfuric acid. The diazo solution obtained is run, while stirring, into a solution of 30 parts of 2-(β-acetyl-ethylamino)-4-acetamino - phenetole combined with hydrochloric acid in water. Ice is added for cooling. The mixture is then diluted with water to 300 parts by volume and after-stirred for 2 hours. Subsequently, the precipitated dyestuff is filtered off with suction, washed until neutral and dried in usual manner. After drying the dyestuff is a blue-black powder which in an aqueous dispersion, at 130° C., dyes polyethylene terephthalate fibers violet shades. The dyeings possess very good fastness properties.

When using instead of the above-mentioned coupling component 2-(β-propionylpropylamino) - 4 - acetamino-phenetole, a dyestuff possessing similarly good properties is obtained.

Example 12

26.2 parts of 2,4-dinitro-6-broaniline are diazotized in usual manner with nitrosylsulfuric acid. The diazo solution obtained is run, while stirring vigorously, into a solution of 30 parts of 2-(β-acetylethylamino)-4-acetamino-phenetole combined with hydrochloric acid which had been cooled with ice. The mixture is diluted slowly with water to 3000 parts by volume and the precipitated dyestuff is filtered off with suction after 2 hours, washed until neutral and dried. It is a blue-black powder which in an aqueous dispersion, at 130° C., dyes polyethylene terephthalate fibers dark blue shades. The dyeings possess a very good fastness to light and to sublimation.

When using instead of the above-mentioned coupling component 2 - (β-isobutyro-ethylamino) - 4 - acetamino-phenetole, a dyestuff possessing similarly good properties is obtained.

We claim:

1. A water-insoluble dyestuff of the formula $$NO_2-\underset{NO_2}{\underset{|}{C_6H_3(X)}}-N=N-\underset{NHCOCH_3}{\underset{|}{C_6H_3(OR_1)}}-NHR_2$$

wherein X represents chlorine or bromine, $R_1$ represents lower alkyl or —$CH_2$—$CH_2$—O—CO-lower alkyl groups, $R_2$ represents lower alkyl, phenyl-lower alkyl, β-hydroxy-γ - chloropropyl or —$CH_2$—$CH_2$—CO-lower alkyl groups, and wherein at most one of $R_1$ and $R_2$ is a lower alkyl group.

2. The water-insoluble monoazo-dyestuff having the formula $$O_2N-\underset{NO_2}{\underset{|}{C_6H_3(Cl)}}-N=N-\underset{NH-CO-CH_3}{\underset{|}{C_6H_3(O-C_2H_5)}}-NH-CH_2-CH_2-CH_2-C_6H_5$$

3. The water-insoluble monoazo-dyestuff having the formula $$O_2N-\underset{NO_2}{\underset{|}{C_6H_3(Cl)}}-N=N-\underset{NH-CO-CH_3}{\underset{|}{C_6H_3(O-C_2H_5)}}-NH-CH_2-CHOH-CH_2-Cl$$

4. The water-insoluble monoazo-dyestuff having the formula $$O_2N-\underset{NO_2}{\underset{|}{C_6H_3(Cl)}}-N=N-\underset{NH-CO-CH_3}{\underset{|}{C_6H_3(O-C_2H_5)}}-NH-CH_2-CH_2-CO-CH_3$$

5. The water-insoluble monoazo-dyestuff having the formula $$O_2N-\underset{NO_2}{\underset{|}{C_6H_3(Br)}}-N=N-\underset{NH-CO-CH_3}{\underset{|}{C_6H_3(O-C_2H_5)}}-NH-CH_2-CHOH-CH_2-Cl$$

6. The water-insoluble monoazo-dyestuff having the formula $$O_2N-\underset{NO_2}{\underset{|}{C_6H_3(Cl)}}-N=N-\underset{NH-CO-CH_3}{\underset{|}{C_6H_3(O-CH_2-CH_2-O-CO-CH_3)}}-NH-CH_2-CH_2-CH_2-CH_3$$

References Cited by the Examiner

UNITED STATES PATENTS 2,083,308    6/1937    Senn _____ 260—207

CHARLES B. PARKER, *Primary Examiner.*

IRVING MARCUS, JOSEPH P. BRUST, *Examiners.*

REYNOLD J. FINNEGAN, DONALD M. PAPUGA,
*Assistant Examiners.*